Nov. 10, 1925.
W. TOPPING ET AL
COFFEEPOT
Filed July 11, 1925
1,560,741
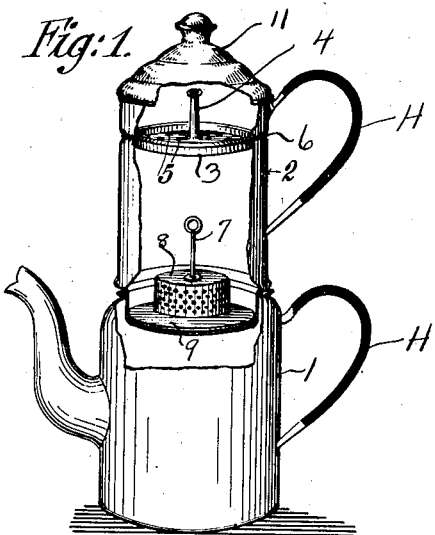
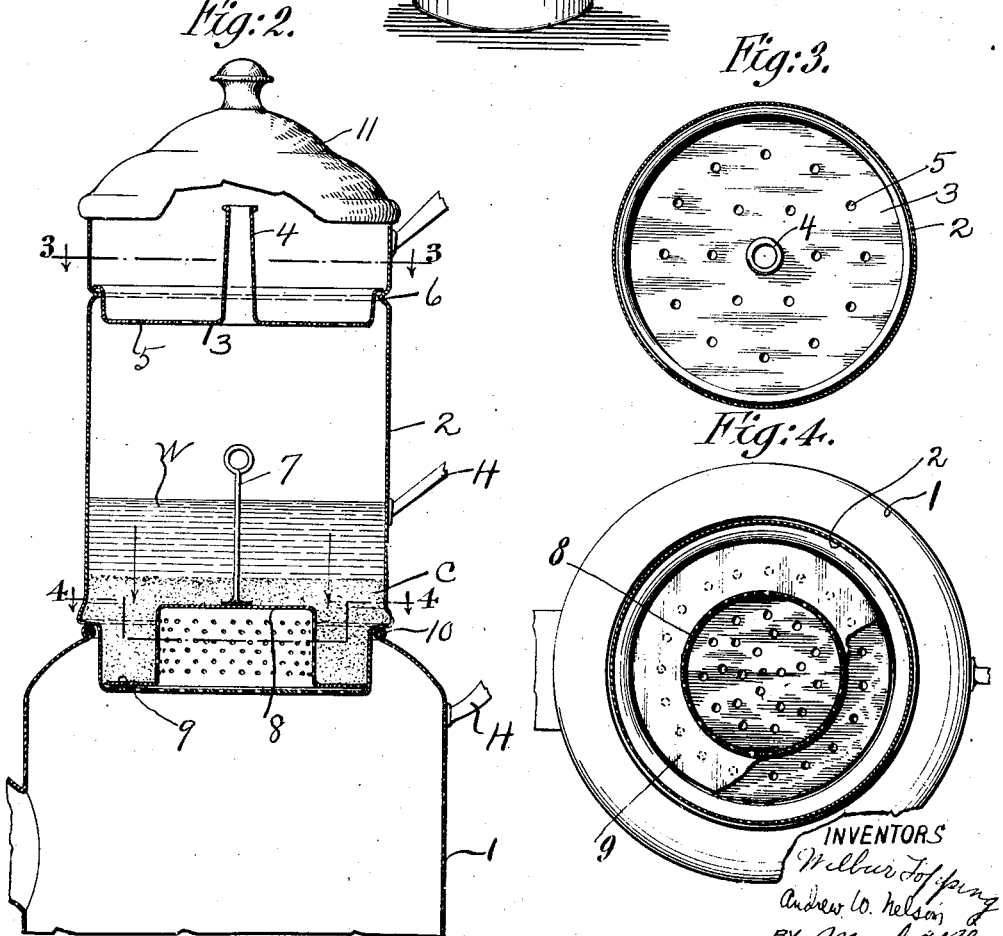
INVENTORS
Wilbur Topping
Andrew W. Nelson
BY Mock & Blum
ATTORNEYS.

Patented Nov. 10, 1925.

1,560,741

UNITED STATES PATENT OFFICE.

WILBUR TOPPING AND ANDREW W. NELSON, OF TERRE HAUTE, INDIANA, ASSIGNORS TO COLUMBIAN ENAMELING & STAMPING CO., OF TERRE HAUTE, INDIANA, A CORPORATION OF INDIANA.

COFFEEPOT.

Application filed July 11, 1925. Serial No. 42,881.

*To all whom it may concern:*

Be it known that we, WILBUR TOPPING and ANDREW W. NELSON, citizens of the United States, both residing at Terre Haute, in the county of Vigo and State of Indiana, have invented certain new and useful Improvements in Coffeepots, of which the following is a specification.

Our invention relates to a new and improved coffee pot or percolator.

One of the objects of our invention is to produce a coffee pot which will produce an improved beverage by means of a drip or infusion process.

Another object of our invention is to provide a coffee pot in which the coffee can be made by the drip or infusion process, whereby the time necessary for making the coffee will be lessened. We prefer that the time for making the infusion should be greater than three minutes and less than ten minutes.

Another object of our invention is to provide a coffee pot of this type in which the full atmospheric pressure can be utilized at all times and under the most favorable conditions to force the hot water through the finely ground coffee.

Other objects of our invention will be set forth in the following description and drawings which illustrate a preferred embodiment thereof.

Figure 1 is an elevation partially in section.

Figure 2 is an enlarged sectional view showing a portion of the coffee pot.

Figure 3 is a section on the line 3—3 of Figure 2.

Figure 4 is a section on the line 4—4 of Figure 2.

The coffee pot consists of a lower section 1 provided with a beaded edge 10 upon which the upper section 2 is adapted to rest. As shown in Figure 2, the upper section 2 is provided with a flange at the bottom thereof and it also has an inner projecting portion at the bottom thereof which extends into the bottom section 1. The upper section 2 is provided with the usual removable cover 11 and it also has an indented portion 6 upon which the lip of the water spreading plate 3 is adapted to rest. The water spreading plate 3 has a series of perforations 5 in the bottom thereof, and it is provided with a central upstanding tube 4 by means of which it can be manipulated. The pot sections 1 and 2 are provided with handles H of any ordinary type.

The strainer or filter cup 8 rests upon the perforated bottom of the section 2. The strainer 8 has a solid top wall, a continuously perforated vertical wall and a bottom flange 9. If desired, the coffee strainer 8 could be made integral or it could be made of any desired number of parts.

The finely ground coffee C is placed in sufficient quantity in the upper pot section 2 so that the top of the coffee layer C extends above the solid top of the strainer 8.

The operation and advantages of the above mentioned construction are as follows:—

Heretofore, the water spreading plate 3 was perforated and it was provided with a central solid handle to enable the said plate to be manipulated.

If the hot water W was poured continuously upon the plate 3, it tended to rise too rapidly above the plate 3 and groove 6, thus producing a species of "water seal" which delayed the passage of the water through the openings in the plate 3. When the previous types of spreading plates were employed, it was necessary for the hot water above the plate 3 to force the air in the section 2 through the finely ground coffee, so that the water could not rapidly escape around the edge of the plate 3 or down through the perforations 5. In any event, the escape of the air in the section 2 was always slow as long as the hot water remained above the plate 3.

According to our invention, the level of the water poured upon the plate 3 is always below the top of the tube 4 so that the air in the top section 2 can always rapidly escape.

The use of the solid top in the strainer or filter cup prevents fine particles of the ground coffee from being carried into the infusion. In addition, the use of the solid top in the filter cup 8 causes the water to be gently forced as a solid body through the ground coffee C so that a maximum amount of the desirable coffee extract is obtained in the minimum of time. The water pressure forces the hot water W horizontally through the holes in the vertical wall of the filter cup and the finely ground coffee forms a perfect filter with the result that a clear amber extract is obtained.

The filter cup is manipulated by the handle 7. All the internal parts of the apparatus are preferably covered or coated with porcelain or some other material so as to render the device perfectly sanitary.

We have described a preferred embodiment of our invention but it is clear that numerous changes and omissions can be made without departing from its spirit.

We claim:—

1. A drip coffee pot comprising a receptacle for coffee and a coffee holding member super-incumbent thereon, a filter cup adjacent the bottom of said coffee chamber having horizontal perforations but having an imperforated top, the coffee being positioned over and around said filter cup and a water spreading plate positioned on top of said coffee chamber, said water spreading plate being provided with an air vent in the center thereof so as to permit the water over said plate to readily fall by gravity over the coffee in the coffee chamber.

2. In a drip coffee pot, the combination of a receptacle for the coffee, a coffee chamber super-incumbent thereon, said coffee chamber having a filter cup positioned in the center and bottom thereof, said filter cup having an imperforated top but perforations on the sides thereof, a handle for said filter cup positioned in the middle of said imperforated top and a water distributing plate above said handle, said water distributing plate having a tube in the center thereof so as to permit free egress of air to the center of said coffee chamber at all times.

3. A drip coffee pot comprising a coffee containing receptacle, a bead on the upper portion of said receptacle supporting a coffee holding member, a filter cup positioned in the center of said coffee holding member and on the bottom thereof, perforations in said filter cup so as to permit the drip coffee to flow horizontally but not perpendicularly therethrough and a water distributing member positioned over the coffee and an air tube in said water distributing member permitting free access to the center of the coffee holding member at all times.

4. A drip coffee pot comprising a receptacle for the filtered coffee, said receptacle having a beaded edge to support the coffee holding member thereon, a horizontally perforated filter cup on the bottom of said coffee holding member, said filter cup having an imperforated top, a handle for said filter cup in the center thereof and a water distributing plate positioned over the coffee and a tube in the center of said water distributing plate permitting the free access of air to the center of said coffee holding chamber.

5. A drip coffee pot comprising a receptacle for the filtered coffee, said receptacle having a beaded edge to support the coffee holding member thereon, a horizontally perporated filter cup on the bottom of said coffee holding member, said filter cup having an imperforated top, a handle for said filter cup in the center thereof and a water distributing plate positioned over the coffee and a tube in the center of said water distributing plate permitting the free access of air to center of said coffee holding chamber, and an indentation in said coffee holding member to support said water distributing plate.

In testimony whereof we affix our signatures.

WILBUR TOPPING.
ANDREW W. NELSON.